Sept. 15, 1936.  A. E. BIENSTOCK  2,054,650
TOILET ACCESSORY FOR AUTOMOTIVE VEHICLES
Filed March 12, 1935
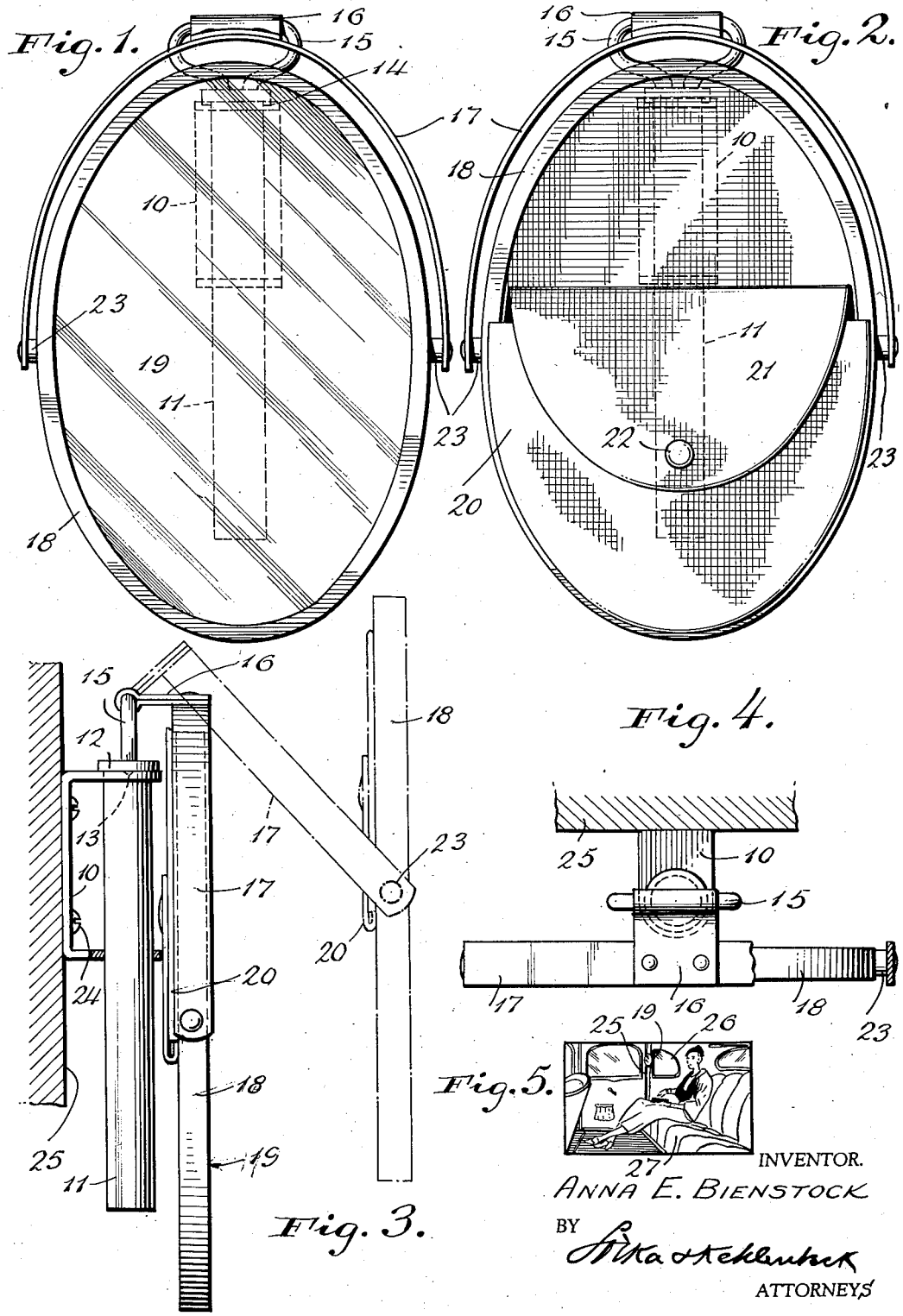
INVENTOR.
ANNA E. BIENSTOCK
BY
ATTORNEYS Patented Sept. 15, 1936

2,054,650

UNITED STATES PATENT OFFICE 2,054,650

TOILET ACCESSORY FOR AUTOMOTIVE VEHICLES

Anna E. Bienstock, Newark, N. J.

Application March 12, 1935, Serial No. 10,638

2 Claims. (Cl. 132—79)

My invention relates to automotive vehicles and more particularly to automobiles of the closed body type, and has for its object to provide such automotive vehicles with a toilet accessory located interiorly of the vehicle in easily accessible relation to a seat thereof. The invention contemplates primarily the production of a toilet accessory capable of being readily installed in the vehicle and including a mirror arranged to be adjusted by an occupant of said seat or in other words a rider in said vehicle, to various reflecting positions relatively to said rider whereby the latter is enabled to comfortably and efficiently utilize said mirror for toilet purposes. Other objects will appear from the description hereinafter and the features of novelty will be pointed out in the claims.

In the accompanying drawing, which illustrates an example of the invention without defining its limits, Figs. 1 and 2 are views showing the opposite faces of the accessory with the parts in a folded position; Fig. 3 is a side elevation of the accessory; Fig. 4 is a plan view thereof partly in section, and Fig. 5 is a pictorial view illustrating an installation of the accessory.

As shown in the drawing, the toilet accessory consists of a supporting bracket 10 of any suitable type in which a pivot member 11 is rotatably mounted to rotate about a vertical axis; in the preferred form the pivot member is in the form of a cylindrical rod projecting through apertures provided in the bracket 10 and fitting said apertures with sufficient friction to retain the pivot member and the parts of the accessory carried thereby in an adjusted position without interfering with intentional rotation of said pivot member 11 about the aforesaid vertical axis. At its upper end the pivot member 11 is provided with an annular flange 12 which rests upon the upper portion of the bracket 10 and maintains said pivot member 11 against unintentional downward movement with respect thereto. Preferably the bracket 10 and the pivot 11 are provided with co-operating means whereby said pivot member is releasably fixed in a predetermined position against rotation about its axis in said bracket; in the illustrated example the co-operating means in question are shown in the form of notches 13 formed on the bracket 10 and projections 14 depending from the annular flange 12 and adapted to become seated in the notches 13 when in registry therewith.

In the illustrated example, an eye-member or yoke 15 projects upwardly from the pivot member 11 to form a support for a carrier 16 which is pivotally mounted on said yoke 15 to swing about an axis in horizontal transverse relation to the vertical axis of the pivot member 11. A suitable frame 17 is fixed upon the carrier 16 to move therewith and in the folded position of the accessory is adapted to depend from said carrier 16 in a plane parallel with and spaced from the pivot member 11 or from the vertical axis thereof, as shown in Fig. 3. The accessory further includes a unit 18 pivotally mounted in the frame 17 and having its opposite faces selectively adjustable to constitute the visible and accessible face of said unit 18; the latter is provided on said opposite faces with toilet aids of different types and characteristics. In the example disclosed in the drawing the toilet aids in question are exemplified by the mirror 19 located on one face of the unit 18 and by a receptacle 20 for cosmetics and the like, located upon the opposite face of said unit, as shown in Figs. 1 and 2 respectively; in the preferred arrangement the receptacle 20 is provided with a cover flap 21 detachably fixed in its closed position by suitable fastening means 22. In the specific arrangement selected for illustration, the unit 18 is pivotally connected with the frame 17 at 23 so as to be capable of swinging about an axis parallel to the axis of the carrier 16, it being understood that although this may be a preferred arrangement, the pivotal mounting of the unit 18 in the frame 17 may be otherwise than as shown.

In practice, the supporting bracket 10 is fixed interiorly of the vehicle with which it is combined in easily accessible relation to a seat for a rider which constitutes part of said vehicle. That is to say, the bracket 10 may be fastened by means of screws or the like 24 to an upright portion 25 of the automotive vehicle, which portion 25 may be adjacent to one of the windows 26 of said vehicle in close proximity to the seat 27 thereof, as pictorially illustrated in Fig. 5. When not in use, the accessory may occupy the folded position illustrated in Fig. 3 in which the frame 17 and unit 18 depend from the carrier 16 in a plane parallel with and spaced from the pivot member 11; in this position the unit 18 may occupy a position in which either of its faces is positioned toward the portion 25 of the automatic vehicle. In Fig. 3 the face provided with the container 20 is positioned toward said portion 25 while the face on which the mirror 19 is located is exposed toward the interior of said vehicle. In this condition the parts of the accessory are in close proximity to the portion 25 so as to not interfere with any of the normal movements of an occupant or occupants of the seat 27. When the rider occupying the seat 27 desires for instance to utilize the mirror 19 of the accessory, the frame 17 and the unit 18 may be swung by the occupant of said seat 27 to a suitable position such as indicated for instance by dotted lines in Fig. 3 and at the same time adjusted by said occupant of said seat as desired about the vertical axis of the pivot member 11. In other words, the unit 18 and the frame 17 are independently and jointly adjustable to set the mirror 19 in selected reflecting position relatively to said rider or to bring said mirror into the most comfortable reflecting position to enable said rider to use said mirror in a simple and efficient manner without requiring the occupant of the seat 27 to leave the latter or to assume an unnatural position thereon. If any of the contents of the container 20 are desired, it is simply necessary to swing the unit 18 on the pivot 23 to bring said container into ready accessibility to enable the contents thereof to be easily removed for use as required.

The novel device provides an accessory which may be easily and quickly installed in automotive vehicles and particularly in automobiles of the closed body type to facilitate application of cosmetics or the performance of other toilet operations by the occupant or occupants of the seat 27 while in a normal seated position on said seat. The accessory, because of its mounting in the automotive vehicle, permits the occupant or occupants of the seat 27 to utilize both hands and does not require any manual effort on the part of said occupant or occupants to support any part of said accessory during use thereof. In addition to its other functions, the accessory adds to the interior ornamentation of the vehicle and to the comfort of the riders therein. The frictional engagement between the pivot member 11 and the bracket 10 serves to maintain the accessory in any position of adjustment about the vertical axis of said pivot member 11, it being understood that the pivotal connection between the carrier 16 and the yoke 15 may also be such as to hold the frame 17 in any position to which it may be set. In the folded inoperative setting of the parts illustrated in Fig. 3, the co-operation of the notches 13 and the projections 14 securely fix the accessory in position against unintentional shifting and thus obviate the possibility that the accessory may interfere with the comfort of the occupants of the car or develop objectionable rattles and other noises.

Various changes in the specific forms shown and described may be made within the scope of the claims without departing from the spirit of the invention.

I claim:

1. A support comprising a bracket adapted to be secured to a vertical member, an element mounted directly in said bracket to turn about a vertical axis with respect thereto, a member mounted directly on said element to turn about a horizontal axis with respect thereto, said member being normal to the said axis, and a U-shaped supporting frame rigid with said member and extending substantially at right angles thereto.

2. A toilet device comprising a bracket adapted to be secured to a vertical member, an element directly mounted in said bracket to turn about a vertical axis with respect thereto, a member directly mounted on said element to turn about a horizontal axis with respect thereto, said member having a U-shaped portion, and a unit mounted to turn in said U-shaped portion about a horizontal axis adapted to carry a mirror on one side thereof and a container on the other side thereof, whereby said U-shaped portion may be swung to such a position that the unit may be turned over to make either side thereof available.

ANNA E. BIENSTOCK.